US009838627B2

(12) United States Patent
Dent et al.

(10) Patent No.: US 9,838,627 B2
(45) Date of Patent: Dec. 5, 2017

(54) IMAGING METHOD AND APPARATUS (71) Applicant: MBDA UK LIMITED, Stevenage, Hertfordshire (GB)

(72) Inventors: Alan John Dent, Hertfordshire (GB); Kwong Cheung Man, Gloucestershire (GB)

(73) Assignee: MBDA UK LIMITED, Stevenage, Hertfordshire (GB)

(*) Notice: Subject to any disclaimer, the term of this patent is extended or adjusted under 35 U.S.C. 154(b) by 131 days.

(21) Appl. No.: 14/422,212

(22) PCT Filed: Jan. 23, 2015

(86) PCT No.: PCT/GB2015/050153
§ 371 (c)(1),
(2) Date: Feb. 18, 2015

(87) PCT Pub. No.: WO2015/114311
PCT Pub. Date: Aug. 6, 2015

(65) Prior Publication Data
US 2016/0261811 A1    Sep. 8, 2016

(30) Foreign Application Priority Data

Jan. 28, 2014   (EP) .................................... 14275017
Jan. 28, 2014   (GB) .................................... 1401442.7

(51) Int. Cl.
*H04N 5/365*    (2011.01)
*H04N 5/355*    (2011.01)
(Continued)

(52) U.S. Cl.
CPC .......... *H04N 5/3651* (2013.01); *H04N 5/355* (2013.01); *H04N 5/357* (2013.01); *H04N 5/3597* (2013.01);
(Continued)

(58) Field of Classification Search
CPC ...... H04N 5/3651; H04N 5/378; H04N 5/355; H04N 5/357; H04N 5/37452; H04N 5/3597
See application file for complete search history.

(56) References Cited

U.S. PATENT DOCUMENTS 6,320,186 B1 * 11/2001 Young ..................... H04N 5/33
250/208.1
6,707,493 B1   3/2004 Lee et al.
(Continued)

FOREIGN PATENT DOCUMENTS

EP         0717560 A1      6/1996
JP    EP 0717569 A2 *      6/1996    ............. G02B 27/26

OTHER PUBLICATIONS

International Preliminary Report on Patentability and Written Opinion dated Aug. 11, 2016 which issued in PCT/GB2015/050153.
(Continued)

*Primary Examiner* — Mekonnen Dagnew
(74) *Attorney, Agent, or Firm* — Scully, Scott, Murphy & Presser, PC (57) ABSTRACT A method of correcting errors in the output of an image detector is disclosed. The method comprises measuring an output signal ($V_m$) of a capacitor ($C_{sh}$) holding a voltage corresponding to a signal detected by the image detector; comparing the value of output signal ($V_m$) to the value of the previously measured output signal ($V_{m-1}$) of the capacitor ($C_{sh}$); calculating the error in the output signal ($V_m$) using a predetermined correction factor and the difference between the value of the output signal ($V_m$) and the value of the previously measured output signal ($V_{m-1}$); and providing a corrected output value ($V_{crt}$) in accordance with the calculated error. Detectors, methods of calibrating detectors, image correction apparatus and guidance systems comprising the detectors are also disclosed.

14 Claims, 4 Drawing Sheets

→

(51) Int. Cl.
*H04N 5/357* (2011.01)
*H04N 5/359* (2011.01)
*H04N 5/3745* (2011.01)
*H04N 5/378* (2011.01)

(52) U.S. Cl.
CPC ......... *H04N 5/378* (2013.01); *H04N 5/37452* (2013.01)

(56) References Cited

U.S. PATENT DOCUMENTS

| | | | |
|---|---|---|---|
| 2005/0128327 A1* | 6/2005 | Bencuya | H01L 27/14603 348/308 |
| 2006/0249679 A1* | 11/2006 | Johnson | G01C 3/08 250/332 |
| 2007/0001116 A1* | 1/2007 | Hayes | G01J 5/10 250/338.1 |
| 2007/0146508 A1 | 6/2007 | Oshima | |
| 2008/0056606 A1 | 3/2008 | Kilgore | |
| 2011/0149136 A1* | 6/2011 | Johnson | H04N 5/378 348/308 |

OTHER PUBLICATIONS

UK Search Report dated Jul. 24, 2014 from related GB 1401442.7.
Extended European Search Report dated Aug. 27, 2014 from related EP 14275017.3.
International Search Report and Written Opinion dated Apr. 8, 2015 from related PCT/GB2015/050153.

\* cited by examiner

IMAGING METHOD AND APPARATUS

FIELD OF THE INVENTION

The present invention concerns imaging sensors. More particularly, but not exclusively, this invention concerns imaging sensors and other detectors that utilise a charge transfer mechanism. The invention also concerns providing a method of reducing errors in the readouts of imaging sensors.

BACKGROUND OF THE INVENTION

Imaging sensors and other detectors that utilize some form of charge transfer mechanism in their readout phases are commonplace. Errors due to stray and parasitic properties of the charge transfer process can cause errors in the output signal of a detector. Such errors may be particularly evident in the output signal immediately following a change in the operating conditions of the detector. The change in conditions may be caused by changes in the signal being detected, or by the manner in which the detector is operated.

In many systems, for example systems that are designed to be read or viewed by the human eye, or systems in which operating conditions change relatively slowly, these errors are of little significance and may be ignored, or not noticed. However, in other systems, for example detectors which detect infra-red radiation, and/or detectors that are used to provide an output to a computer-controlled, fast-moving vehicle, and/or where operating conditions are rapidly changing, such errors may be more significant and limit the performance of a system.

Such a limitation may be particularly evident on systems using infra-red sensors, where mismatches between infra-red detector elements making up a detector may require ongoing calibration checks during a detection process. For example, for each frame where detection data is obtained, there may be a following calibration step.

The present invention seeks to mitigate the above-mentioned problems. Alternatively or additionally, the present invention seeks to provide an improved detector system and method of correcting errors in detector output.

SUMMARY OF THE INVENTION

The present invention provides a method of correcting errors in the output of an image detector comprising the steps of:

measuring an output signal ($V_m$) of a capacitor ($C_{sh}$) holding a voltage corresponding to a signal detected by the image detector;

comparing the value of the output signal ($V_m$) to the value of the previously measured output signal (($V_{m-1}$)) of the capacitor ($C_{sh}$);

calculating the error in the output signal ($V_m$) using a predetermined correction factor and the difference between the value of the output signal ($V_m$) and the value of the previously measured output signal (($V_{m-1}$)); and providing a corrected output value ($V_{crt}$) in accordance with the calculated error.

Advantageously, the method provides a means by which to correct the output of a detector without requiring the detector to be physically altered. The method allows the correction of the output of existing detectors. Therefore, the accuracy of the output of existing detectors may be improved by use of the method of the invention. The method may increase the range of uses to which a detector may be put, or increase confidence in the output of a detector, or may improve the performance of a system of which the detector forms part.

The image detector may comprise a plurality of detector elements arranged in a detector array. The operation of the detector may include a charge transfer mechanism whereby the signal output by the detector is caused by a signal detected by the detector. The charge transfer mechanism may comprise a charge being transferred from a capacitor associated with a detector element to a capacitor associated with a detector output circuit.

An example detector is an infra-red image detector. The method of correcting errors may be particularly useful for use with infra-red detectors. Infra-red detectors may comprise an array comprising plurality of detector elements, each detector element representing a pixel. An example array may comprise many thousands of detector elements/pixels arranged in a multidimensional array. The capacitance of each detector element may be different. The detector elements in an infra-red detector may be mismatched, and more mismatched than is usually found in an optical detector array. The mismatch between detector elements may require a calibration process for the detector to be present. The accuracy of the calibration is dependent on the errors in the individual pixel outputs. The mismatch of infra-red detector elements within an array may mean that it is not possible to apply a consistent error correction factor across each element of the array. The method may comprise the step of pre-determining a correction factor for each individual element of a detector array. The method may comprise correcting the output of each individual element of a detector array.

A detector element may comprise a capacitor with a capacitance of $C_{pix}$. The charge transfer mechanism may comprise a charge being transferred from the capacitor $C_{pix}$ to the capacitor $C_{sh}$. The charge transfer mechanism may include a stray or parasitic capacitance $C_{str}$, which is not reset as part of the detectors normal operating mechanism and has memory of previous pixel values. The correction factor applied during the error correction process may be a ratio of $C_{pix}$, $C_{str}$, and $C_{sh}$. The correction factor may be:

$$\frac{C_{str}}{(C_{pix} + C_{sh})}$$

The correct output value ($V_{crt}$) may be calculated as:

$$V_{crt} = V_m + (V_m - V_{m-1})\frac{C_{str}}{(C_{pix} + C_{sh})}$$

The correction factor may be determined for each detector element of a detector array during a calibration process.

The detector may be associated with and provide data to a guidance system. The guidance system may be operated by a computer. The guidance system may be automatically operated by a computer. The guidance system may be associated with and control a vehicle. The vehicle may be a fast-moving vehicle. The vehicle may be capable of flight. As an example, the vehicle may be a missile or a drone aircraft. The application of error correction to image detectors used in these fields may be particularly advantageous due to the fast changing operational environment, and the potential problems caused as a result of inaccurate detector readings.

According to a second aspect of the invention, there is also provided a method of calibrating a detector, the method comprising the following steps:

the detector taking a plurality of measurements of a first stable scene until the measurements of the first stable scene become consistent changing the scene to a second stable scene, the detector taking a plurality of measurements of the second stable scene until the measurements of the second stable scene become consistent, and estimating an error correction factor based on the difference between the consistent measurements of the first stable scene, the first measurement of the second stable scene and the consistent measurements of the second stable scene.

According to a third aspect of the invention there is provided a detector comprising at least one detector element, the detector element including a capacitor ($C_{pix}$) for storing a charge corresponding to a signal detected by the detector element, the detector further comprising a capacitor ($C_{sh}$) linked to a readout element of the detector to which the charge stored by the detector element capacitor ($C_{pix}$) may be transferred during a readout phase, wherein during use a stray capacitance ($C_{str}$) is present in the detector, the detector further comprising a processing unit arranged to measure the signal provided to the readout element of the detector and correct the output signal according to the method as described in relation to the first aspect of the invention.

According to a fourth aspect of the invention, there is provided an image correction apparatus comprising a processing unit adapted to be associated with an image detector, the processing unit arranged to correct the output of the associated image detector according to the method as described in relation to the first aspect of the invention.

According to a fifth aspect of the invention, there is provided a guidance system for a computer controlled vehicle, the guidance system comprising an image detector according to the third aspect of the invention. The guidance system may be a computer-controlled guidance system.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
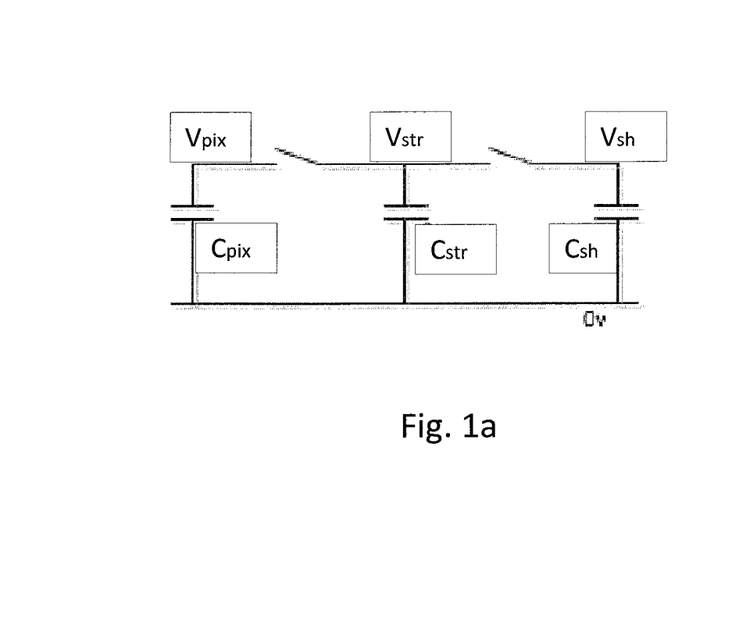
FIGS. 1a and 1b shows a simple model of the charge transfer process of a detector according to a first embodiment of the invention.
Figure 1B:
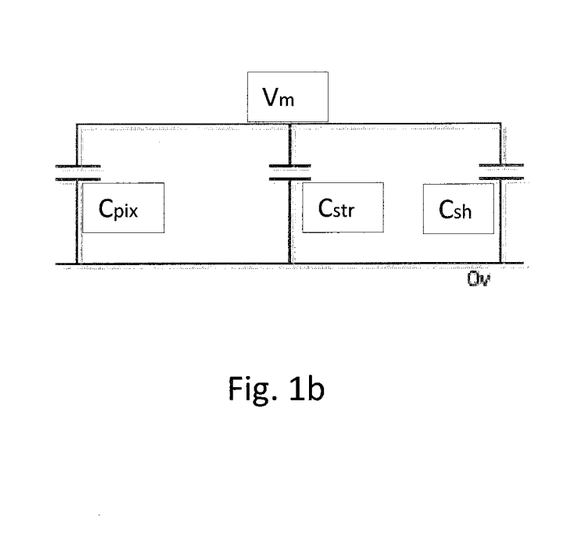

FIGS. 1a and 1b show a simple model of the charge transfer process of a detector. $C_{pix}$ represents a capacitor holding a voltage corresponding to the detected signal, $C_{sh}$ represents a capacitor to which the charge stored on $C_{pix}$ is transferred during the readout phase of the detector, and $C_{str}$ represents a stray or parasitic capacitance present in the implementation of the charge transfer process. A key factor in the cause of the error which may be produced during changing conditions is that the due to the stray or parasitic properties of $C_{str}$, $C_{str}$ does not get reset between the measurements of input signal by $C_{pix}$.

Figure 2:
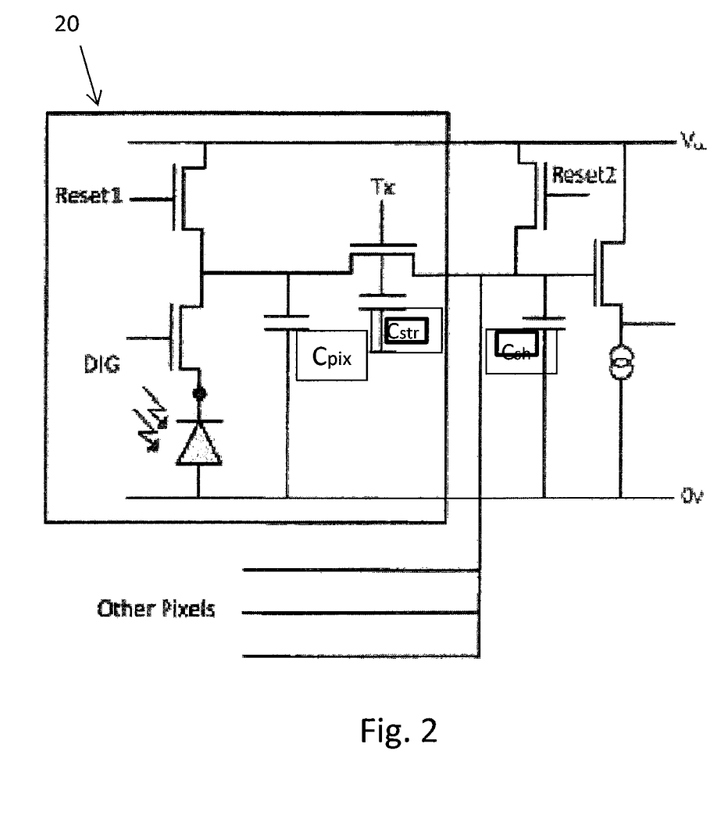
FIG. 2 shows an example detector element according to a first embodiment of the invention.

FIG. 2 shows a single element of an example detector together with a shared output amplifier. The pixel element (detector element) of the detector is indicated by the box 20. Outside the box 20 is the common sample hold capacitor $C_{sh}$ and the output amplifier.

Figure 3:
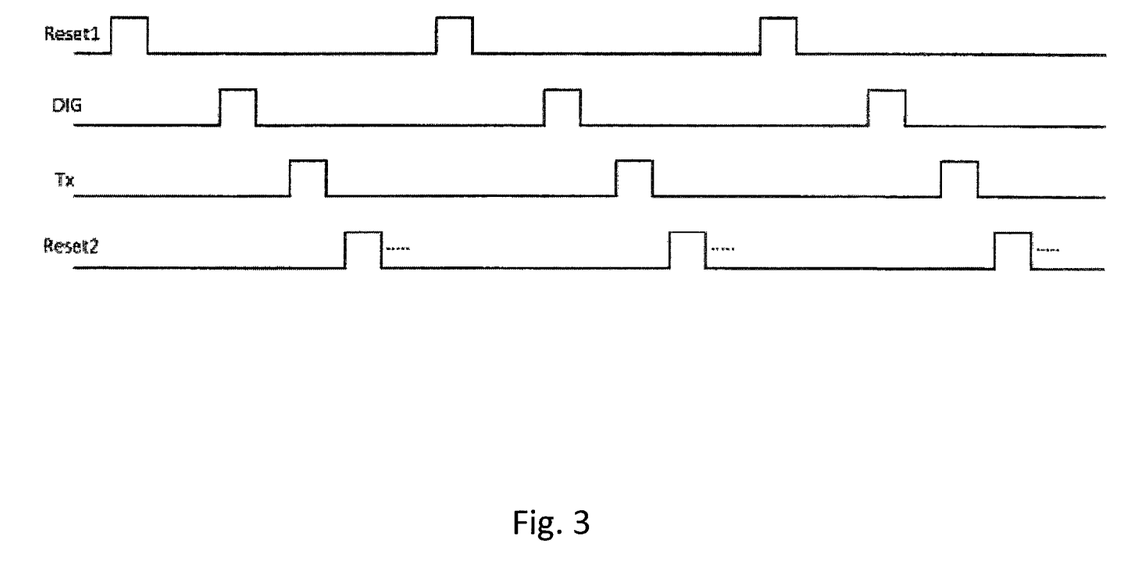
FIG. 3 shows a timing sequence of a detector element according to the first embodiment of the invention.

The pixel circuit 20 comprises a Detector Diode and a Direct Injection Gate (DIG) readout circuit. The overall detector element operates by integrating the reverse leakage current of the Detector Diode during the DIG pulse, with the capacitor $C_{pix}$. The Detector Diode in this embodiment is a CMT Detector Diode but a skilled person will appreciate other suitable Detector Diodes may be used. FIG. 3 shows the timing sequence of the circuit operation.

The timing of the $T_x$ pulse is different for each pixel connected to the common output amplifier, and the Reset and DIG pulses are common to all pixels. A Reset pulse occurs after each pixel's $T_x$ pulse.

The detection process is initiated with the arrival of the Reset pulse. This pulse allows $C_{pix}$ to be pre-charged to the starvation voltage of the detector. A Reset pulse is also applied to pre-charge $C_{sh}$. Following the Reset pulse is the DIG pulse. This pulse has two parameters, height and width. The height of the DIG pulse is used to reverse bias the Detector Diode and the width of the DIG pulse determines the integration time. The DIG transistor is a source follower and during the DIG pulse the transistor provides a reverse bias voltage across the CMT Detector Diode. This causes a reverse leakage current to flow, which is sourced by the capacitor $C_{pix}$, and the current flow causes the voltage across $C_{pix}$ to reduce. The amount of reverse leakage current and therefore voltage drop in the capacitor $C_{pix}$ is determined by the incident flux of the Detector Diode. The greater the flux, the greater the current, and the lower the voltage.

At the end of the DIG pulse the reverse bias voltage is removed, and $C_{pix}$ is effectively isolated with a voltage corresponding to the integration of the current flow during the integration time. A $T_x$ pulse is then applied which connects $C_{pix}$ to the sample hold capacitor $C_{sh}$. The parallel combination of $C_{pix}$ and $C_{sh}$ produce a voltage at $C_{sh}$ which is a representation of the integrated photo-current produced by the Detector Diode. The voltage at $C_{sh}$ is buffered by the output source follower and is available at the amplifier output. The $T_x$ pulse is removed and following a Reset pulse, the next pixel connected to $C_{sh}$ via that pixel's $T_x$ pulse. At the end of the frame readout, the system is reset and the cycle repeated during the next frame.

Errors in detector output arise when the capacitor $C_{str}$ is added to the circuit. This is not a real capacitor but is a stray charge storage element that can be modelled as a capacitor operating in the following way.

$C_{str}$ is considered to be connected in parallel with $C_{pix}$ and $C_{sh}$ when $T_x$ is present (as shown in FIG. 1a) and isolated at other times. If $C_{str}$ is present when $T_x$ is not present, $C_{str}$ will not get reset to a specific value during the reset period, and will retain the pixel value from the previous measurement frame. Therefore, $C_{str}$ provides a "memory" of the previous measurement frame.

When the detector is observing a scene that is constant over a sequence of frames, the flux incident on any pixel of a detector is constant, and the output of each pixel is constant, with the exception of temporal noise. Therefore, for each pixel, the voltages across $C_{pix}$ and $C_{sh}$ are driven to the same values in each frame. This will be the same voltage that gets stored across $C_{str}$.

When the detector is observing a scene that is changing, the flux incident on each pixel may change. When $T_x$ is applied, $C_{str}$ forms a parallel combination with $C_{pix}$ and $C_{sh}$. It is required that $C_{pix}$, $C_{sh}$ and $C_{str}$ have a common voltage across them. Without $C_{str}$ being present, $C_{pix}$ and $C_{sh}$ would combine to give the correct output voltage. However, $C_{str}$ is present and holds a charge representing the pixel voltage from the previous frame. Therefore, depending on whether this voltage is higher or lower than the desired voltage for the current frame, $C_{str}$ will either accept charge from or give charge to the $C_{pix}$, $C_{sh}$ combination.

If the current frame has received more flux than the previous frame, the new pixel voltage will be less than the previous frame voltage, so the voltage stored by $C_{str}$ will be higher than the correct voltage for the new frame. When the Transfer Gate is opened by $T_x$ the higher voltage across $C_{str}$ will cause a rising of the desired output voltage and the pixel appears to have received less flux than it actually received, i.e. a shortfall on a low flux to high flux transition. On the next frame, for the same input conditions, the difference between the correct output voltage and the level of corruption to the output voltage will be much smaller and may not be observable.

If the incident flux is less than that of the previous frame, the process is as follows. In this case, the voltage stored on $C_{str}$ is less than the correct output voltage and hence when $T_x$ is applied it causes a reduction in the output voltage, indicating that the pixel received more flux than it actually did, i.e. a shortfall on a high flux to low flux transition.

The shortfall described, being a pixel process, could produce a noticeable effect if a moving object is present in a number of consecutive frames, with a sufficient intensity difference. This effect could be seen as a trail across consecutive frames and may be referred to as a remnance effect.

In order to prevent the detector error causing problems in an imaging system, it is necessary to remove the memory effect provided by $C_{str}$. Say, for example, a value of $C_{pix}$ in an imaging system including a detector was around 500 fF. $C_{str}$ may only require a value of around 5 fF in order to start having a negative effect on the measured values and accuracy of a system, and 5 fF is not a large value.

A method for correcting the error due to the stray capacitance $C_{str}$ in the model described above is provided. A method of calculating $C_{str}$ if the values of $C_{pix}$ and $C_{sh}$ are available is also provided.

FIGS. 1a and 1b demonstrate the operation of the detector. At the end of the integration, $C_{pix}$ is charged to a value determined by the incident radiation during the integration time. During the readout phase, as shown in FIG. 1a, this charge is shared between $C_{pix}$, $C_{str}$ and $C_{sh}$ and a common voltage $V_m$ exists across all three capacitors. $V_m$ is being used to represent the output voltage of the detector element and in practice the actual output voltage will be offset from this due to the output amplifier stage of the detector. However, $V_m$ is sufficient for our present purpose.

In FIG. 1a, represents the voltage across $C_{pix}$ at the end of the integration period, $V_{str}$ is the stored voltage across $C_{str}$ from the previous frame, and $V_{sh}$ is the initial voltage of $C_{sh}$, the sample hold capacitor.

The voltage across $C_{str}$ will be equal to the pixel voltage of the previous frame, so $V_{str}=(V_{m-1})$, and $V_{sh}=V_{strv}$, where $V_{strv}$ is the starvation voltage used to charge $V_{sh}$ during the pixel reset period.

As the two states of the system maintain the total stored charge in the system remaining constant, we have:

$$V_{pix}C_{pix}+V_{m-1}C_{str}+V_{strv}C_{sh}=V_m(C_{pix}+C_{str}+C_{sh}) \quad \text{(eq. 1)}$$

For an ideal detector, $C_{str}=0$, so rearranging eq. 1 we get:

$$V_m = \frac{V_{pix}C_{pix} + V_{strv}C_{sh}}{C_{pix} + C_{sh}} = V_{crt} \quad \text{(eq. 2)}$$

Where $V_{crt}$ is the correct output voltage. Combining eq. 1 and eq.2, we can imply:

$$V_{crt} = V_m \frac{(C_{pix} + C_{str} + C_{sh})}{(C_{pix} + C_{sh})} - V_{m-1} \frac{C_{str}}{(C_{pix} + C_{sh})} \quad \text{(eq. 3)}$$

The correct output voltage is dependent only on the measured values of output voltage from the previous frame and current frame. The correct value also requires knowledge of the ratio of the capacitor values of the detector.

Eq. 3 can be rearranged into the form:

$$V_{crt} = V_m + (V_m - V_{m-1}) \frac{C_{str}}{(C_{pix} + C_{sh})} \quad \text{(eq. 4)}$$

It is possible to measure the term $$\frac{C_{str}}{(C_{pix} + C_{sh})}$$

on a per pixel basis, thus allowing individual correction of pixel values without requiring knowledge of the capacitance values.

The nominal capacitance values $C_{pix}$ and $C_{str}$ may be known, or at least provided by the detector manufacturer. The value of $C_{str}$ may be unknown or known. However, the value of $C_{str}$ can be determined for each detector pixel. Rearranging eq. 4, $$C_{str} = \frac{(V_{crt} - V_m)}{(V_m - V_{m-1})}(C_{pix} + C_{sh}) \quad \text{(eq. 5)}$$

This value may be calculated for each individual pixel and can be used to correct the measured detector output for pixel shortfall. By measuring the output voltage on the frame immediately preceding a change in value, followed by measuring the voltage after it has settled to its final value, it is possible to estimate the value of the effective stray capacitance if you have knowledge of the pixel capacitor $C_{pix}$ and sample-hold capacitor $C_{sh}$ values. However, by rearranging eq. 5

$$\frac{C_{str}}{(C_{pix} + C_{sh})} = \frac{(V_{crt} - V_m)}{(V_m - V_{m-1})} \quad \text{(eq. 6)}$$

as is required by the shortfall correction equation, it is only necessary to determine the ratio of the capacitor values and not the absolute values.

In order to provide a corrected detector output, the following steps may be carried out. A calibration of the detector may be undertaken, where for each pixel the ratio of the capacitor values $C_{str}$, $C_{pix}$, and $C_{sh}$, is determined. This may be done by measuring the pixel output when the detector is staring at a stable image, in order to determine a value for $(V_{m-1})$. The image may then be changed, and the output measured once more, to provide a value for $V_m$ immediately following the change. The correct output value $V_{crt}$ may then be measured, by allowing the detector to stare at the now stable image until the error caused by the stray capacitance disappears. The correct output value $V_{crt}$ may be determined by inputting the values of $V_m$, $(V_{m-1})$, into eq. 3, along with the calibration value as has been previously determined. Therefore, there is provided a method of correcting for shortfall errors in detector output as a post-measurement step, and without requiring any physical alteration of the detector apparatus.

According to a further aspect of the invention, the algorithm for performing the correction of the detector output signal may be stored on a computer readable medium associated with a detector unit. Such a computer readable medium may be a computer processing unit adapted to receive the output signal of an associated detector. The computer processing unit may comprise a memory for storing previously measured output signals of an associated detector in order to input those values into the correction algorithm.

In a yet further aspect of the invention, a vehicle guidance system may be provided, the guidance system comprising a detector, the detector comprising a computer readable medium as described above. The detector output may feed into the vehicle guidance system in order to provide guidance data to the system.

In a further aspect of the invention, the detector may be arranged to detect light in the infra-red spectrum.

Figure 4:
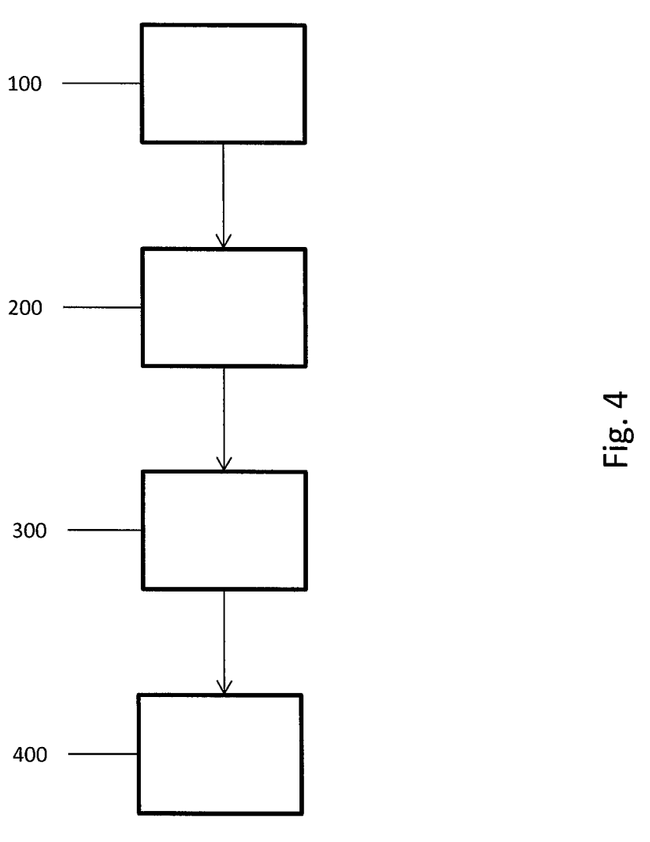
FIG. 4 is a graphical representation of the image correction process according to an embodiment of the invention.

FIG. 4 shows an example of the method of correcting errors in the output of an image detector according to the present invention. The error correction process begins at step 100, where the output signal $V_m$ of a capacitor $C_{sh}$ which holds a voltage corresponding to a signal detected by the image detector is measured. As the next step 200, a comparison is made of the value of the output signal $V_m$ to the value of the previously measured output signal $V_{m-1}$ of the capacitor $C_{sh}$. The next step 300 comprises calculating the error in the output signal $V_m$ using a predetermined correction factor and the difference between the value of the output signal $V_m$ and the value of the previously measured output signal $(V_{m-1})$. Finally, at step 400, there is provided a corrected output value $V_{crt}$ in accordance with the calculated error.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of correcting errors in an output of an image detector, the image detector comprising at least one detector element, the method comprising the steps of:
    measuring an output signal (Vm) of a capacitor (Csh) holding a voltage corresponding to a signal detected by one of the at least one detector element;
    comparing the value of output signal (Vm) to a value of a previously measured output signal (Vm−1) of the capacitor (Csh), each value corresponding to a signal detected by the one detector element;
    calculating the error in the output signal (Vm) using a predetermined correction factor and the difference between the value of the output signal (Vm) and the value of the previously measured output signal (Vm−1); and
    providing a corrected output value (Vcrt) in accordance with the calculated error.

2. A method as claimed in claim 1, wherein the image detector comprises a plurality of detector elements arranged in a detector array.

3. A method as claimed in claim 2, comprising the step of correcting the output of each detector element of the detector array.

4. A method as claimed in any preceding claim, wherein an operation of the image detector comprises a charge transfer mechanism.

5. A method as claimed in claim 4, wherein each detector element comprises a capacitor $C_{pix}$, and the charge transfer mechanism comprises a charge being transferred from the capacitor $C_{pix}$ to the capacitor $C_{sh}$, and the charge transfer mechanism further includes a stray or parasitic capacitance $C_{str}$ within the image detector.

6. A method as claimed in claim 5, wherein the correction factor applied during the error correction process is a ratio of $C_{pix}$, $C_{str}$, and $C_{sh}$.

7. A method as claimed in claim 6, wherein the correction factor is dependent on the ratio:

$$\frac{C_{str}}{(C_{pix} + C_{sh})}.$$

8. A method as claimed in claim 7, wherein the correct output value ($V_{crt}$) is calculated by:

$$V_{crt} = V_m + (V_m - V_{m-1})\frac{C_{str}}{(C_{pix} + C_{sh})}.$$

9. A method as claimed in claim 1, comprising the step of the correction factor being determined for each detector element of a detector array during a calibration process.

10. A method as claimed in claim 1, wherein the image detector is an infrared detector.

11. A method as claimed in claim 1, further comprising the following steps:
    taking a plurality of measurements with the image detector of a first stable scene until the measurements of the first stable scene become consistent changing the scene to a second stable scene, taking a plurality of measurements with the detector of the second stable scene until the measurements of the second stable scene become consistent, and estimating an error correction factor based on the difference between the consistent measurements of the first stable scene, the first measurement of the second stable scene and the consistent measurements of the second stable scene.

12. An image detector comprising at least one detector element, the detector element including a capacitor ($C_{pix}$) for storing a charge corresponding to a signal detected by the detector element, the image detector further comprising a capacitor ($C_{sh}$) linked to a readout element of the image detector to which the charge stored by the detector element capacitor ($C_{pix}$) may be transferred during a readout phase, wherein during use a stray capacitance ($C_{str}$) is present in the image detector, the image detector further comprising a processor comprising a memory arranged to measure the signal provided to the readout element of the image detector and correct the output signal according to the method as claimed in claim 1.

13. A guidance system for a computer controlled vehicle, the guidance system comprising an image detector according claim 12.

14. An image correction apparatus comprising a non-transitory computer readable medium adapted to be associated with an image detector, the non-transitory computer readable medium arranged to correct the output of the associated image detector according to the method as claimed in claim 1.

* * * * *